United States Patent
Kraus et al.

(10) Patent No.: US 11,198,786 B2
(45) Date of Patent: Dec. 14, 2021

(54) DISPERSION ADHESIVES

(71) Applicant: Covestro Intellectual Property GmbH & Co. KG, Leverkusen (DE)

(72) Inventors: Harald Kraus, Leverkusen (DE); Robert Liberati, Hürth-Efferen (DE); Peter Kueker, Leverkusen (DE); Martin Melchiors, Leichlingen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/274,821

(22) PCT Filed: Sep. 25, 2019

(86) PCT No.: PCT/EP2019/075842
§ 371 (c)(1),
(2) Date: Mar. 10, 2021

(87) PCT Pub. No.: WO2020/064826
PCT Pub. Date: Apr. 2, 2020

(65) Prior Publication Data
US 2021/0317307 A1    Oct. 14, 2021

(30) Foreign Application Priority Data
Sep. 27, 2018    (EP) .................................... 18197309

(51) Int. Cl.
| | |
|---|---|
| C08L 75/06 | (2006.01) |
| C08G 18/75 | (2006.01) |
| C08G 18/73 | (2006.01) |
| C08G 18/72 | (2006.01) |
| C08G 18/42 | (2006.01) |
| C09J 175/06 | (2006.01) |
| B05D 5/10 | (2006.01) |
| C08G 18/08 | (2006.01) |
| C08G 18/12 | (2006.01) |

(52) U.S. Cl.
CPC ............... *C08L 75/06* (2013.01); *B05D 5/10* (2013.01); *C08G 18/0828* (2013.01); *C08G 18/12* (2013.01); *C08G 18/4211* (2013.01); *C08G 18/4238* (2013.01); *C08G 18/722* (2013.01); *C08G 18/73* (2013.01); *C08G 18/755* (2013.01); *C09J 175/06* (2013.01); *C08G 2110/005* (2021.01); *C08G 2170/80* (2013.01); *C08G 2250/00* (2013.01); *C08L 2350/00* (2013.01); *C08L 2205/025* (2013.01)

(58) Field of Classification Search
CPC ................................................ C09J 175/04–12
See application file for complete search history.

(56) References Cited

U.S. PATENT DOCUMENTS

| | | | | |
|---|---|---|---|---|
| 4,386,992 A | * | 6/1983 | Takegawa | C09J 5/04 156/327 |
| 6,290,803 B1 | * | 9/2001 | Maksymkiw | C09J 175/06 156/331.7 |
| 9,453,147 B2 | | 9/2016 | Kraus et al. | |
| 2009/0240005 A1 | | 9/2009 | Kraus et al. | |
| 2016/0375450 A1 | | 12/2016 | de Block et al. | |

FOREIGN PATENT DOCUMENTS

| | | |
|---|---|---|
| DE | 69604664 T2 | 6/2000 |
| DE | 102008009517 A1 | 8/2009 |
| WO | 2014182170 A1 | 11/2014 |

OTHER PUBLICATIONS

Cognard, P. Adhesives and Sealants: General Knowledge, Application Techniques, New Curing Techniques. Handbook of Adhesives and Sealants, vol. 2. Elsevier Ltd. 2006. pp. 97-99. (Year: 2006).*
International Search Report, PCT/EP2019/075842, dated Nov. 13, 2019, Authorized officer: Francis Adigbli.

* cited by examiner

*Primary Examiner* — Stephen E Rieth
(74) *Attorney, Agent, or Firm* — Jed C. Benson

(57) ABSTRACT

The invention relates to the use of aqueous dispersion adhesives on the basis of a mixture of aqueous polyurethane or polyurethane-urea dispersions for bonding foam substrates according to the spray coagulation method.

6 Claims, 1 Drawing Sheet

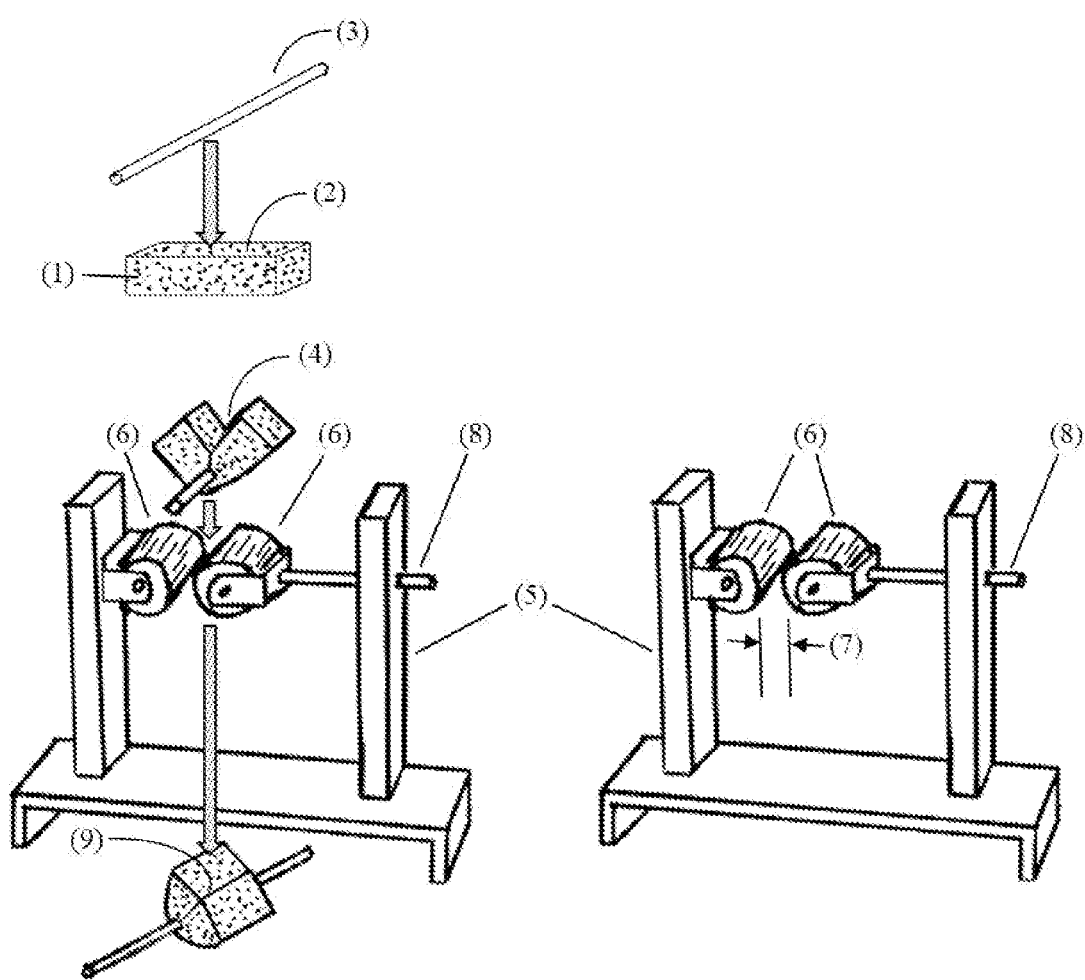

DISPERSION ADHESIVES

CROSS-REFERENCE TO RELATED APPLICATION

This application is a national stage application under 35 U.S.C. § 371 of PCT/EP2019/075842, filed Sep. 25, 2019, which claims the benefit of European Application No. 18197309.0, filed Sep. 27, 2018, each of which is incorporated herein by reference.

FIELD

The invention relates to the use of aqueous dispersion adhesives based on a mixture of aqueous polyurethane or polyurethane-urea dispersions for the adhesive bonding of foam substrates by the spray coagulation process.

BACKGROUND

When adhesively bonding foam substrates to other substrates, for example for the combinations foam-foam, foam-wood and foam-plastic, use is predominantly made of polychloroprene dispersion adhesives in the spray coagulation process. In this process, the adhesive and a coagulant are conveyed separately into a spray gun, mixed in the spray jet and coagulated. As the mixing does not take place until in the spray jet, no pot life needs to be taken into account. In addition, the coagulated adhesive remains on the substrate surface to be adhesively bonded and only diffuses to a minor extent, if at all, into the pore structure of the foam substrates. High initial strengths, sufficiently long open times and good heat resistances are frequently achieved.

Important fields of application are the production of mattresses and seating furniture. In particular from Scandinavian countries, there is a demand for chlorine-free alternatives to the polychloroprene dispersion adhesives, in order for example to be able to satisfy the requirements of the Nordic Ecolabel (type I environmental label according to ISO 14024). In addition, they should feature high initial strengths and a sufficiently long open time.

Adhesives based on aqueous polyurethane dispersions have become established worldwide in demanding industrial applications, for example in the case of shoe manufacturing, the bonding of parts for motor vehicle interiors, sheet lamination or the adhesive bonding of textile substrates.

In the case of the use of such dispersions for bonding substrates, this is usually carried out after the heat-activation process. In this case, the dispersion is applied to the substrate and, after complete evaporation of the water, the adhesive layer is activated by heating, for example using an infrared radiator, and is converted into an adhesive state. The temperature at which the adhesive film becomes sticky is referred to as the activation temperature.

However, when using polyurethane or polyurethane-polyurea dispersions, the process of wet bonding can also be used, that is to say the adhesive bonding is effected immediately after application of the adhesive. Mechanical securing of the parts to be joined is necessary until the adhesive has set. This process is often used for the adhesive bonding of wood or textile substrates.

Both the heat activation process and the wet bonding process are of limited suitability for the adhesive bonding of foam substrates. The slow evaporation of the water, in particular, requires long waiting times between application of the adhesive and the bonding process, or appropriate drying installations. In addition, a not insignificant portion of the adhesive can diffuse into the pores of the foam substrates prior to or during the drying and is then no longer available for the actual bonding.

The adhesives based on aqueous polyurethane dispersions which are established on the market are generally not suitable for the use of the spray coagulation process since they either do not coagulate sufficiently rapidly, do not have sufficient initial strengths, or, as a result of the crystallinity of the polymers, form very hard bond seams which are unacceptable in particular for mattress production. The open time, that is to say the time period between application of the adhesive until joining together the parts to be joined, during which a sufficiently good bonded connection is still obtained, is generally only one minute. For many bonding processes, however, at least twice as much time is required.

WO 2013/053786 A1 describes aqueous polyurethane dispersions, the polymer of which has a melting temperature in the range from 30° C. to 50° C., determined by differential scanning calorimetry in accordance with DIN 65467 at a heating rate of 20 K/min, wherein the polymer is obtainable from two dissimilarly crystallizing polyester polyols in specified quantitative ratios. These polyurethane dispersions are primarily suitable as cold contact adhesives, but can also be employed using spray coagulation processes. However, the initial strengths achievable thereby are insufficient for most foam bonding applications.

Luphen® D DS 3548 from BASF AG (Ludwigshafen, Germany) provides an epoxy resin-modified polyurethane dispersion which inter alia is reportedly also suitable for the spray coagulation process. The basis of the epoxy resin used here is bisphenol A diglycidyl ether. Since bisphenol A and the conversion products formed therefrom are viewed in an extremely critical manner in particular by end consumers in respect of a possible effect on the endocrine system and accordingly are generally rejected, the market is demanding adhesives and other products which are free from bisphenol A.

WO 2014/182170 A1 describes performing the spray coagulation process using a particular airless spray process. To this end, mixtures both of polychloroprene dispersions and tackifier dispersions and also of polyurethane dispersions and tackifier dispersions are used. However, these are not specified further in this document. Fields of application mentioned are foam adhesive bonds in the mattress and furniture manufacturing sector. However, this prior art does not disclose either the nature of the polyurethane dispersions used nor the measures which can be taken to ensure a high initial strength and a sufficiently long open time.

The object of the present invention was therefore that of providing a chlorine- and bisphenol A-free alternative to polychloroprene dispersion adhesives for the adhesive bonding of foam substrates by the spray coagulation process which does not exhibit the disadvantages of the prior art and which features high initial strengths and a sufficiently long open time of at least 2 minutes.

EP 2 090 603 A2 discloses aqueous dispersions containing a mixture of

A) an aqueous polyurethane or polyurethane-urea dispersion containing
  I. a polymer A) formed from
    I (i). at least one difunctional aliphatic polyester polyol having a molecular weight of 400 to 5000 g/mol,
    I (ii). at least one mixture of hexamethylene diisocyanate (HDI) and 1-isocyanato-3,3,5-trimethyl-5-isocyanatomethylcyclohexane (IPDI), and I (iii). at least one mixture of two or more aminic chain extenders, wherein at least one compound bears an ionic group, and the polymer A) after drying is semicrystalline or crystalline with a glass transition at a glass transition temperature Tg of between −65° C. and −40° C., B) an aqueous polyurethane or polyurethane-urea dispersion which differs from A) and contains II. a polymer B) formed from II (i). at least one difunctional aromatic polyester polyol having a molecular weight of 400 to 5000 g/mol, II (ii). at least one difunctional polyol component having a molecular weight of 62 to 399, II (iii). at least one aliphatic diisocyanate and II (iv). at least one aminic chain extender having an ionic group, wherein the polymer B) after drying is amorphous with a glass transition at a glass transition temperature Tg of between −15° C. and +10°.

SUMMARY

According to EP 2 090 603 A2, the described mixtures of aqueous polyurethane or polyurethane-polyurea dispersions are suitable as adhesives both according to the heat activation process and according to the wet bonding process, and display bond strengths that are better than the individual components.

Surprisingly, it has now been found that the mixtures of aqueous polyurethane or polyurethane-polyurea dispersions which are described in EP 2 090 603 A2 are also outstandingly suitable for the adhesive bonding of foam substrates by the spray coagulation process, provided that defined quantitative ratios are complied with:

The present invention therefore provides for the use of aqueous dispersions containing a mixture of A) an aqueous polyurethane or polyurethane-urea dispersion containing I. a polymer A) formed from I (i). at least one difunctional aliphatic polyester polyol having a molecular weight of 400 to 5000 g/mol, I (ii). at least one mixture of hexamethylene diisocyanate (HDI) and 1-isocyanato-3,3,5-trimethyl-5-isocyanatomethylcyclohexane (IPDI), and I (iii). at least one mixture of two or more aminic chain extenders, wherein at least one compound bears an ionic group, and the polymer A) after drying is semicrystalline or crystalline with a glass transition at a glass transition temperature Tg of between −65° C. and −40° C., and B) an aqueous polyurethane or polyurethane-urea dispersion which differs from A) and contains II. a polymer B) formed from II (i). at least one difunctional aromatic polyester polyol having a molecular weight of 400 to 5000 g/mol, II (ii). at least one difunctional polyol component having a molecular weight of 62 to 399, II (iii). at least one aliphatic diisocyanate and II (iv). at least one aminic chain extender having an ionic group, wherein the polymer B) after drying is amorphous with a glass transition at a glass transition temperature Tg of between −15° C. and +10° C.;

and wherein the mixture contains 34.8% to 90.2% by weight of polymer A) and 9.8% to 65.2% by weight of polymer B), for the adhesive bonding of foam substrates by the spray coagulation process.

BRIEF DESCRIPTION OF THE DRAWINGS

Various features and characteristics of the inventions described in this specification may be better understood by reference to the accompanying FIGURES, in which:

FIG. 1 schematically depicts a method of determining initial strength of an adhesive.

DETAILED DESCRIPTION

The dispersions referred to as polyurethane dispersions in connection with the present invention contain as disperse phase polymers which may be polyurethanes in the narrower sense, that is to say those polymers which are obtained by polymerization of polyols and polyisocyanates, but they may also be those in which monoamines and/or diamines are used as formation components, possibly as chain extenders. The dispersions that can be used according to the invention are therefore referred to as aqueous polyurethane or polyurethane-urea dispersions.

In the spray coagulation process, the aqueous adhesive dispersions and also a coagulant are conveyed separately into a two-component spray gun and mixed in the spray jet. Spraying is typically effected using atomizer air at 0.1-5 bar of pressure; however, it is also possible to deliver at least one of the two components airlessly, as described for example in WO 2015/137808. The coagulation of the dispersion takes place in the spray jet on the path to the surface of the first substrate; a portion of the water present in the adhesive dispersion already evaporates in the process. On impact, the adhesive polymer forms on the surface of the first substrate a film which is immediately tacky in the still-wet state. As the mixing of adhesive dispersion and coagulant does not take place until in the spray jet, no pot life needs to be taken into account. On account of the tackiness of the polymer film in the wet state, the second surface can be immediately joined, ideally for example with pressure on the substrates towards the adhesive surface. The application of pressure by pressing the two substrate surfaces together is advantageous since it increases the strength of the bond. It is likewise advantageous when at least one of the two substrates is porous or permeable to water, in order to allow for the transport of water away out of the solidifying adhesive joint.

Suitable coagulants include aqueous solutions of salts, preferably of metals of the first, second and third main group of the Periodic Table, in particular if they exhibit a good water solubility. Salts based on divalent or trivalent cations are preferably used. Particular preference is given to using calcium chloride, zinc sulfate or aluminum sulfate. Very particular preference is given to using calcium chloride. Mixtures of different salts as per the above description can also be used as the aqueous solution.

The concentration of the salts in the aqueous salt solutions suitable as coagulant is 1% to 20% by weight, preferably 2% to 10% by weight and particularly preferably 3% to 4% by weight. The proportion of the aqueous solution of the coagulant, based on the sum of adhesive solution plus coagulant solution, is between 0.1% and 50% by weight, preferably between 1% and 30% by weight, particularly preferably between 8% and 20% by weight and very particularly preferably between 12% and 18% by weight.

Alternatively, coagulants used may also be aqueous solutions of inorganic or organic acids, preferably citric acid, phosphoric acid or carbonic acid, and mixtures of one or more of the abovementioned salts with one or more of these acids.

The dispersions used according to the invention in each case generally contain 30% to 55% by weight of solids, preferably 38% to 52% by weight. Based on the polymers A) and B) present as disperse phase in the dispersions, the mixtures according to the invention contain 34.8% to 90.2% by weight of polymer A) and 9.8% to 65.2% by weight of polymer B), preferably 44.4% to 87.8% by weight of polymer A) and 12.2% to 55.6% by weight of polymer B), particularly preferably 54.5% to 81.9% by weight of polymer A) and 18.1% to 45.5% by weight of polymer B), and very particularly preferably 65.1% to 81.9% by weight of polymer A) and 18.1% to 34.9% by weight of polymer B), based on the total weight of polymeric solids A) and B).

Suitable difunctional aliphatic polyester polyols A) I(i). which can be used include in particular linear polyester diols as can be prepared in a known manner from aliphatic or cycloaliphatic dicarboxylic acids, such as for example succinic, methylsuccinic, glutaric, adipic, pimelic, suberic, azelaic, sebacic, nonanedicarboxylic, decanedicarboxylic, tetrahydrophthalic, hexahydrophthalic, cyclohexanedicarboxylic, maleic, fumaric, malonic or mixtures thereof with polyhydric alcohols such as for example ethanediol, di-, tri-, or tetraethylene glycol, propane-1,2-diol, di-, tri-, or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures thereof. Instead of the free polycarboxylic acid, the corresponding polycarboxylic anhydrides or corresponding polycarboxylic esters of lower alcohols or mixtures thereof can also be used to produce the polyesters.

Preference is given to difunctional aliphatic polyester polyols A) I(i). based on succinic acid, methylsuccinic acid, glutaric acid, adipic acid or maleic acid and propane-1,3-diol, butane-1,4-diol or hexane-1,6-diol.

Particular preference is given to difunctional aliphatic polyester polyols A) I(i). based on adipic acid and butane-1,4-diol or hexane-1,6-diol.

Very particular preference is given to difunctional aliphatic polyester polyols A) I(i). based on adipic acid and butane-1,4-diol.

The molecular weight of the difunctional aliphatic polyester polyol A) I(i). is between 400 and 5000 g/mol, preferably between 1500 and 3000 g/mol, particularly preferably between 1900 and 2500 g/mol, very particularly preferably between 2100 and 2300 g/mol.

The isocyanate component A) I(ii). used is a mixture of hexamethylene diisocyanate (HDI) and 1-isocyanato-3,3,5-trimethyl-5-isocyanatomethylcyclohexane (IPDI). The HDI: IPDI molar ratio is preferably between 9:1 and 1:9, particularly preferably between 3:1 and 1:3, it is very particularly preferably 2:1.

The component A) I(iii). consists of a mixture of two or more aminic chain extenders, wherein at least one compound bears an ionic group. In the context of the invention, chain extenders also include monoamines which lead to chain termination.

Examples of monoamines are aliphatic and/or alicyclic primary and/or secondary monoamines such as ethylamine, diethylamine, the isomeric propyl- and butylamines, higher linear aliphatic monoamines and cycloaliphatic monoamines such as cyclohexylamine. Further examples are aminoalcohols, i.e. compounds containing amino and hydroxyl groups in one molecule, such as for example ethanolamine, N-methylethanolamine, diethanolamine or 2-propanolamine. Further examples are monoamino compounds which additionally bear sulfonic acid and/or carboxyl groups, such as for example taurine, glycine or alanine.

Examples of diamino compounds are ethane-1,2-diamine, hexamethylene-1,6-diamine, 1-amino-3,3,5-trimethyl-5-aminomethylcyclohexane (isophoronediamine), piperazine, 1,4-diaminocyclohexane or bis(4-aminocyclohexyl)methane. Adipic dihydrazide, hydrazine and hydrazine hydrate are furthermore suitable. Polyamines such as diethylenetriamine may also be used as formation component instead of a diamino compound.

Further examples are aminoalcohols, i.e. compounds containing amino and hydroxyl groups in one molecule, such as for example 1,3-diamino-2-propanol, N-(2-hydroxyethyl)ethylenediamine or N,N-bis(2-hydroxyethyl)ethylenediamine Examples of diamino compounds having an ionic group, which therefore additionally bear sulfonate and/or carboxylate groups, include for example the sodium or potassium salts of N-(2-aminoethyl)-2-aminoethanesulfonic acid/-carboxylic acid, of N-(3-aminopropyl)-2-aminoethanesulfonic acid/-carboxylic acid, of N-(3-aminopropyl)-3-aminopropanesulfonic acid/carboxylic acid or of N-(2-aminoethyl)-3-aminopropanesulfonic acid/-carboxylic acid. Preference is given to the sodium salt of N-(2-aminoethyl)-2-aminoethanesulfonic acid.

Preferred constituents of the mixture A) I(iii). are diethanolamine, ethane-1,2-diamine, 1-amino-3,3,5-trimethyl-5-aminomethylcyclohexane (isophoronediamine), piperazine, N-(2-hydroxyethyl)ethylenediamine and the sodium salts of N-(2-aminoethyl)-2-aminoethanesulfonic acid/-carboxylic acid.

Particular preference is given to a mixture of diethanolamine and the sodium salt of N-(2-aminoethyl)-2-aminoethanesulfonic acid.

The polymer A) after drying is semicrystalline or crystalline with a glass transition at a glass transition temperature Tg of between −65° C. and −40° C., preferably with a Tg of between −60° C. and −45° C., particularly preferably of between −55° C. and −50° C.

The polymer A) is referred to as semicrystalline or crystalline when, in DSC measurement in accordance with DIN 65467 at a heating rate of 20 K/min, it has a melting peak which corresponds to an enthalpy of fusion >5 J/g, preferably >10 J/g, particularly preferably >20 J/g and very particularly preferably >40 J/g. The melting peak is caused by the melting of regular substructures in the polymer. The melting temperature is in this case preferably in a range between 30° C. and 80° C., particularly preferably between 40° C. and 70° C., very particularly preferably between 42° C. and 55° C. The first heating is evaluated in order to also detect polymers which crystallize slowly.

The polymer B) is referred to as amorphous when, during the first heating, it does not have a melting peak or only has a melting peak with an enthalpy of fusion <5 J/g, preferably <3 J/g, particularly preferably <1 J/g.

In a preferred embodiment of the invention, the amorphous polymer B) does not have a melting peak.

Suitable difunctional aromatic polyester polyols B) II(i). in particular include linear polyester diols as may be prepared in a known manner from aromatic dicarboxylic acids, such as for example terephthalic, isophthalic or o-phthalic acid and also acid anhydrides thereof, such as for example ophthalic anhydride, with polyhydric alcohols, such as for example ethanediol, di-, tri-, or tetraethylene glycol, propane-1,2-diol, di-, tri-, or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures of these.

Preference is given to difunctional aromatic polyester polyols B) II(i). based on o-phthalic acid, ophthalic anhydride and butane-1,4-diol or hexane-1,6-diol.

Particular preference is given to difunctional aromatic polyester polyols B) II(i). based on ophthalic acid or o-phthalic anhydride and hexane-1,6-diol.

The molecular weight of the difunctional aromatic polyester polyol B) II(i). is between 400 and 5000 g/mol, preferably between 1500 and 3000 g/mol, particularly preferably between 1800 and 2300 g/mol, very particularly preferably between 1900 and 2100 g/mol.

Examples of difunctional polyol components having a molecular weight of 62 to 399 and which are suitable as formation component B) II(ii). are the products listed under A) I(i). and B) II(i)., provided they have a molecular weight of 62 to 399 daltons. Further suitable components are the polyhydric, in particular dihydric, alcohols cited for the preparation of the polyester polyols and also further low molecular weight polyester diols such as for example bis (hydroxyethyl) adipate. Also suitable are short-chain difunctional polyether polyols such as for example the homopolymers, copolymers and graft polymers of ethylene oxide or of propylene oxide.

Preferred formation components B) II(ii). are butane-1,4-diol and hexane-1,6-diol, and hexane-1,6-diol is particularly preferred.

Suitable formation components B) II(iii). are any desired aliphatic compounds having at least two free isocyanate groups per molecule. Preference is given to using diisocyanates Y(NCO)$_2$, where Y is a divalent aliphatic hydrocarbon radical having 4 to 12 carbon atoms or a divalent cycloaliphatic hydrocarbon radical having 6 to 15 carbon atoms. Examples of such diisocyanates which are preferably to be used include tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane or 4,4'-diisocyanato-2,2-dicyclohexylpropane, or mixtures thereof.

Particular preference is given to hexamethylene diisocyanate (HDI), 1-isocyanato-3,3,5-trimethyl-5-isocyanatomethylcyclohexane (IPDI) and 4,4'-diisocyanatodicyclohexylmethane, and mixtures thereof. However, the isocyanates are preferably used alone.

Very particular preference is given to hexamethylene diisocyanate (HDI).

Aminic chain extenders B) II(vi). having an ionic group are preferably diamino compounds which additionally bear sulfonate and/or carboxylate groups, such as for example the sodium or potassium salts of N-(2-aminoethyl)-2-aminoethanesulfonic acid, of N-(3-aminopropyl)-2-aminoethanesulfonic acid, of N-(3-aminopropyl)-3-aminopropanesulfonic acid, of N-(2-aminoethyl)-3-aminopropanesulfonic acid, or of the analogous carboxylic acids.

Particular preference is given to the sodium salts of N-(2-aminoethyl)-2-aminoethanesulfonic acid and of the analogous carboxylic acid, very particular preference is given to the sodium salt of N-(2-aminoethyl)-2-aminoethanesulfonic acid.

The aminic chain extenders B) II(iv). having an ionic group may be used alone or together with other aminic chain extenders as have been described for example under A) I(iii). They are preferably used alone.

The polymer B) after drying is amorphous with a glass transition at a glass transition temperature Tg of between −15° C. and +10° C., preferably with a Tg of between −10° C. and +5° C., particularly preferably of between −5° C. and 0° C.

The aqueous polyurethane or polyurethane-urea dispersions containing the polymers A) or B) have a solids content of 10% to 70% by weight, preferably of 25% to 60% by weight and particularly preferably of 35% to 55% by weight.

The aqueous polyurethane or polyurethane-urea dispersions containing the polymers A) or B) are preferably prepared by the acetone process. To this end, prepolymers are prepared from the components A) I(i). and A) I(ii)., and respectively from B) II(i)., B) II(ii). and B) II(iii)., are dissolved in acetone and are chain-extended with the components A) I(iii). and, respectively, B) II(iv). The acetone is distilled off after dispersing with water. The application and performance of the acetone process is prior art and is known to those skilled in the art.

The aqueous polyurethane or polyurethane-urea dispersions containing the polymers A) or B) and the mixtures according to the invention preferably do not contain any external emulsifiers.

The dispersions according to the invention are preferably prepared by mixing the aqueous polyurethane or polyurethane or polyurethane-urea dispersions of polymers A) and B).

The adhesive bonds produced with the dispersions according to the invention by the spray coagulation process display sufficient immediate strengths before instantaneous tearing of the material, with an open time of at least 3 minutes. In particular when adhesively bonding foam on foam or foam on other substrate surfaces, such as for example wood, metal or plastic, which have a three-dimensional structure and hence are not flat, the adhesive bonds produced by the process according to the invention are capable of absorbing the restoring forces of the foam without a waiting time, in particular without the complete removal of the water. An example of such an application is the adhesive bonding of cuboid foam blocks to form cushions by bending the narrow side surfaces and, after the spray application of the adhesive dispersion according to the invention, immediately pressing them against one another while wet Thanks to the high immediate wet strength, the applied pressure can be immediately released again without the strained foam springing back or shifting.

In particular, the dispersions according to the invention are used to produce adhesive compositions which are suitable for the production of adhesive composites where the adhesive composite comprises a substrate, the dispersion according to the invention, and a further substrate. The two substrates can consist of the same or different materials. By definition, the substrates can also be sheet-like structures. The at least one substrate is preferably a foam substrate.

A foam substrate is understood to mean a substrate made of foam, foams generally being synthetically produced substances having a cellular structure and low density. A distinction can be made here between open-cell, closed-cell and mixed-cell foams. Depending on the hardness, foams are divided into rigid and flexible foams. Virtually all plastics are suitable for foaming.

In principle, the dispersions according to the invention are suitable for the adhesive bonding of all foam substrates by the spray coagulation process. Preference is given to adhesively bonding open-cell and mixed-cell foam substrates.

In a preferred embodiment of the invention, the foam substrate(s) is/are composed of polyurethane (for example polyether and polyester foams) and/or a rubber, such as for example natural rubber (NR), styrene-butadiene rubber (SBR), ethylene-propylene-diene polymer (EPDM), butadiene-acrylonitrile rubber (NBR) or chloroprene rubber (CR).

In a particularly preferred embodiment of the invention, the foam substrate(s) is/are composed of polyurethane.

The dispersions according to the invention moreover feature good adhesion to a very wide variety of other substrates, such as for example to wood, paper, leather, textiles, cork, and plastics (thermoplastics, elastomers, thermosets, composites) such as different polyvinyl chloride qualities, polyurethanes, polyvinyl acetate, ABS, rubbers, poly(ethylene-vinyl acetate), polycarbonate or polyolefins, such as for example filled or unfilled polypropylene. In rare cases, pretreatment of the substrate surface is necessary, for example by priming, singeing or corona treatment, in particular in the case of nonpolar substrates.

The adhesive compositions, containing the dispersions according to the invention, are thus suitable for the adhesive bonding of any desired substrates, preferably formed from the abovementioned materials.

The adhesives according to the invention are particularly suitable for the bonding of foam on foam, foam on wood, foam on various plastics, and of textiles on various substrates.

An adhesive composite comprising substrates and sheet-like structures adhesively bonded with the dispersions used according to the invention is also subject matter of the present application, as are adhesive joined foam substrates which are obtained by the use according to the invention.

EXAMPLES

The invention will be elucidated in more detail below on the basis of the examples. The following methods and test methods were used here:

A) Spray Coagulation Process:

A standard spray gun for two-component dispersion adhesives, namely the PILOT III 2K from Walther Pilot, is used for application. The adhesive and the coagulant $CaCl_2$) (3% by weight solution in water) are conveyed separately into the spray gun, mixed in the spray jet and the adhesive is coagulated. As the mixing does not take place until in the spray jet, no pot life needs to be taken into account. A ratio of 86% by weight adhesive dispersion and 14% by weight $CaCl_2$) solution was chosen.

The precise settings of the spray gun are known in principle to the person skilled in the art and can be tailored to the specific case without undue burden and determined by simple preliminary experiments. The quantitative ratios and the application weight can be determined by reweighing the reservoir vessel and the substrates.

The following settings were used:
a.) Adhesive component: conveying pressure 1.3 bar
b.) Coagulation component: conveying pressure 0.3 bar
c.) Atomizer air pressure: 2.8 bar
d.) Bore diameter (nozzle) for adhesive component: 1.0 mm
e.) Bore diameter (nozzle) for coagulant component: 0.4 mm
f.) Application weights: 130-150 $g/m^2$ (wet)

B) Determination of the Initial Strength:

As test material, ST 5540 (1) PU foam test specimens from STN Schaumstoff-Technik-Nurnberg GmbH having the dimensions 10×5×3 cm and a foam density of 40 $kg/m^3$ are used (see FIG. 1). For assessment of the initial strength, immediately after application of the adhesive to the upper side (2) of the foam bodies (1) by the spray coagulation process (application rate 130-150 $g/m^2$ wet), the test specimens are folded (4) in the middle with a wooden rod (3) (D=7 mm round wood or 7×7 mm rectangle) and fed by means of the test apparatus (5) through 2 steel rolls (6) (diameter 40 mm, length 64 mm) the tangential spacing (7) of which was previously set to 10 mm using a threaded spindle (8). The initial strength is sufficient if the test specimen or the bond seam (9) does not come undone despite the restoring forces present in the test specimen.

C) Determination of the Open Time

As test material, Recticel T 20120 polyether foam bodies from Recticel having the dimensions 10×5×3 cm and a foam density of 20 $kg/m^3$ are used. To assess the open time, the test specimens are folded in the middle and joined together with light palm pressure immediately, every 60 seconds, or if necessary at time intervals to be defined, after the application of adhesive by means of the spray coagulation process (application rate 130-150 $g/m^2$ wet). The end of the open time is indicated by the strength no longer sufficing and the test specimen opening as a result of the restoring forces arising.

D) Ascertainment of the Hardness of the Bond Seam:

The bond seam of the test specimen produced under B) was assessed in direct comparison with reference samples sensorially by means of touch after 24 h of storage at room temperature. The reference samples were produced using commercially available polychloroprene latices (Covestro Deutschland AG) having differing Shore A hardness. The bond seam of the test specimen formed from Dispercoll® C 84 (Shore A hardness of the pure, dried polymer=88) was taken as a reference for a hard bond seam, the bond seam of the test specimen formed from Dispercoll® C 74 (Shore A hardness of the pure, dried polymer=55) was taken as a reference for a bond seam of intermediate hardness and the bond seam of the test specimen formed from Dispercoll® C 2372 (Shore A hardness of the pure, dried polymer=40) was taken as a reference for a soft bond seam.

E) Ascertainment of the Glass Transition Temperatures, Melting Temperatures and Enthalpies of Fusion by Means of DSC:

The glass transition temperatures and also melting temperatures and enthalpies of fusion were determined by means of differential scanning calorimetry (DSC) using a Pyris Diamond DSC calorimeter from Perkin-Elmer. To this end, a film was produced by knife coating the dispersion onto a glass sheet at a 100 μm wet film thickness, flashed off for 2 hours, and then this film together with the glass sheet is dried in a dry box for 3 days at room temperature and 0% relative room humidity. Then, using 10 mg of sample material from this film, the DSC curve was recorded with the following measurement conditions: Rapid cooling to the starting temperature $-100°$ C., then commencement of three heatings from $-100°$ C. to $+150°$ C. at a heating rate of 20 K/min and a cooling rate of 320 K/min under a helium atmosphere and with cooling with liquid nitrogen. The glass transition temperature corresponds to the temperature at half the height of the glass transition, with the third heating being assessed. For determination of the melting temperatures and enthalpies of fusion, the first heating was assessed.

F) Feedstocks:

Polyester I: polyester diol formed from butane-1,4-diol and adipic acid having an OH number=50

Polyester II: polyester diol formed from hexane-1,6-diol and phthalic anhydride having an OH number=56

Desmodur® II: hexamethylene 1,6-diisocyanate (Covestro Deutschland AG, Leverkusen/Germany)

Desmodur® I: isophorone diisocyanate (Covestro Deutschland AG, Leverkusen/Germany)

Example 1 (According to the Invention)

Preparation of an Aqueous Polyurethane or Polyurethane-Urea Dispersion Containing Polymer A):

450 g of polyester I are dewatered for 1 hour at 110° C. and 15 mbar. At 80° C., 30.11 g of Desmodur® H and then 20.14 g of Desmodur® I are added. The mixture is stirred at 80 to 90° C. until a constant isocyanate content of 1.15% has been reached. The reaction mixture is dissolved in 750 g of acetone and cooled to 48° C. Into the homogeneous solution is added a solution of 5.95 g of the sodium salt of N-(2-aminoethyl)-2-aminoethanesulfonic acid and 2.57 g of diethanolamine in 65 g of water with vigorous stirring. After 30 minutes, the mixture is dispersed by addition of 700 g of water. Distillative removal of the acetone affords an aqueous polyurethane-polyurea dispersion having a solids content of 40.0% by weight.

The polymer present is semicrystalline after drying with a glass transition at a glass transition temperature Tg of −54° C., a melting temperature of 48° C. and an enthalpy of fusion of 50.4 J/g.

Example 2 (According to the Invention)

Preparation of an Aqueous Polyurethane or Polyurethane-Urea Dispersion Containing Polymer B):

1215 g of polyester II are dewatered for 1 hour at 110° C. and 15 mbar. At 80° C., 4.6 g of hexane-1,6-diol and 179.0 g of Desmodur® H are added and the mixture is stirred at 90° C. until a constant isocyanate content of 2.28% has been reached. The reaction mixture is dissolved in 2490 g of acetone and cooled to 48° C. Into the homogeneous solution is added a solution of 31.9 g of the sodium salt of N-(2-aminoethyl)-2-aminoethanesulfonic acid in 300 g of water with vigorous stirring. After 30 minutes, the mixture is dispersed by addition of 1150 g of water. Distillative removal of the acetone affords an aqueous polyurethane-polyurea dispersion having a solids content of 50.0% by weight.

The polymer present is amorphous after drying (does not have a melting peak in DSC) and has a glass transition at a glass transition temperature Tg of −1.5° C.

Example 3 (Comparison)

Use of the dispersion from example 1 (containing 100% polymer A). As can be seen from the table, while the initial strength is good, an excessively hard bond seam is obtained and the open time, at one minute, is insufficient.

Example 4 (Comparison)

Preparation of a Mixture According to the Invention of the Dispersions of Examples 1 and 2 and Use:

95 parts by weight of the dispersion from example 1 (semicrystalline) and 5 parts by weight of the dispersion from example 2 (amorphous) are mixed and homogenized with stirring. Taking the solids contents into consideration, the mixture according to the invention contains 93.8% by weight of polymer A and 6.2% by weight of polymer B.

As can be seen from the table, while the initial strength is good, an excessively hard bond seam is obtained and the open time, at one minute, is insufficient.

Example 5 (According to the Invention)

Preparation of a Mixture According to the Invention of the Dispersions of Examples 1 and 2 and Use:

92 parts by weight of the dispersion from example 1 (semicrystalline) and 8 parts by weight of the dispersion from example 2 (amorphous) are mixed and homogenized with stirring. Taking the solids contents into consideration, the mixture according to the invention contains 90.2% by weight of polymer A and 9.8% by weight of polymer B.

As can be seen from the table, the initial strength is good, the bond seam is of intermediate hardness and the open time, at three minutes, meets requirements.

Example 6 (According to the Invention)

Preparation of a Mixture According to the Invention of the Dispersions of Examples 1 and 2 and Use:

90 parts by weight of the dispersion from example 1 (semicrystalline) and 10 parts by weight of the dispersion from example 2 (amorphous) are mixed and homogenized with stirring. Taking the solids contents into consideration, the mixture according to the invention contains 87.8% by weight of polymer A and 12.2% by weight of polymer B.

As can be seen from the table, the initial strength is good, the bond seam is of intermediate hardness and the open time, at four minutes, meets requirements.

Example 7 (According to the Invention)

Preparation of a Mixture According to the Invention of the Dispersions of Examples 1 and 2 and Use:

85 parts by weight of the dispersion from example 1 (semicrystalline) and 15 parts by weight of the dispersion from example 2 (amorphous) are mixed and homogenized with stirring. Taking the solids contents into consideration, the mixture according to the invention contains 81.9% by weight of polymer A and 18.1% by weight of polymer B.

As can be seen from the table, the initial strength is good, the bond seam is of intermediate hardness and the open time, at 7 minutes, meets requirements.

Example 8 (According to the Invention)

Preparation of a Mixture According to the Invention of the Dispersions of Examples 1 and 2 and Use:

80 parts by weight of the dispersion from example 1 (semicrystalline) and 20 parts by weight of the dispersion from example 2 (amorphous) are mixed and homogenized with stirring. Taking the solids contents into consideration, the mixture according to the invention contains 76.2% by weight of polymer A and 23.8% by weight of polymer B.

As can be seen from the table, the initial strength is good, the bond seam is of intermediate hardness and the open time, at 7 minutes, meets requirements.

Example 9 (According to the Invention)

Preparation of a Mixture According to the Invention of the Dispersions of Examples 1 and 2 and Use:

75 parts by weight of the dispersion from example 1 (semicrystalline) and 25 parts by weight of the dispersion from example 2 (amorphous) are mixed and homogenized with stirring. Taking the solids contents into consideration, the mixture according to the invention contains 70.6% by weight of polymer A and 29.4% by weight of polymer B.

As can be seen from the table, the initial strength is good, the bond seam is of intermediate hardness and the open time, at 7 minutes, meets requirements.

Example 10 (According to the Invention)

Preparation of a Mixture According to the Invention of the Dispersions of Examples 1 and 2 and Use:

70 parts by weight of the dispersion from example 1 (semicrystalline) and 30 parts by weight of the dispersion from example 2 (amorphous) are mixed and homogenized with stirring. Taking the solids contents into consideration, the mixture according to the invention contains 65.1% by weight of polymer A and 34.9% by weight of polymer B.

As can be seen from the table, the initial strength is good, the bond seam is of intermediate hardness and the open time, at 7 minutes, meets requirements.

Example 11 (According to the Invention)

Preparation of a Mixture According to the Invention of the Dispersions of Examples 1 and 2 and Use:

60 parts by weight of the dispersion from example 1 (semicrystalline) and 40 parts by weight of the dispersion from example 2 (amorphous) are mixed and homogenized with stirring. Taking the solids contents into consideration, the mixture according to the invention contains 54.5% by weight of polymer A and 45.5% by weight of polymer B.

As can be seen from the table, the initial strength is good, the bond seam is of intermediate hardness and the open time, at 7 minutes, meets requirements.

Example 12 (According to the Invention)

Preparation of a Mixture According to the Invention of the Dispersions of Examples 1 and 2 and Use:

50 parts by weight of the dispersion from example 1 (semicrystalline) and 50 parts by weight of the dispersion from example 2 (amorphous) are mixed and homogenized with stirring. Taking the solids contents into consideration, the mixture according to the invention contains 44.4% by weight of polymer A and 55.6% by weight of polymer B.

As can be seen from the table, the initial strength is good, the bond seam is of intermediate hardness and the open time, at 4 minutes, meets requirements.

Example 13 (According to the Invention)

Preparation of a Mixture According to the Invention of the Dispersions of Examples 1 and 2 and Use:

40 parts by weight of the dispersion from example 1 (semicrystalline) and 60 parts by weight of the dispersion from example 2 (amorphous) are mixed and homogenized with stirring. Taking the solids contents into consideration, the mixture according to the invention contains 34.8% by weight of polymer A and 65.2% by weight of polymer B.

As can be seen from the table, the initial strength is good, the bond seam is soft and the open time, at 3 minutes, meets requirements.

Example 14 (Comparison)

Preparation of a Mixture According to the Invention of the Dispersions of Examples 1 and 2 and Use:

30 parts by weight of the dispersion from example 1 (semicrystalline) and 70 parts by weight of the dispersion from example 2 (amorphous) are mixed and homogenized with stirring. Taking the solids contents into consideration, the mixture according to the invention contains 25.5% by weight of polymer A and 74.5% by weight of polymer B.

As can be seen from the table, there is no initial strength.

Example 15 (Comparison)

Use of the dispersion from example 2 (containing 100% polymer B).

As can be seen from the table below, there is no initial strength.

TABLE

Results of the experiments according to the invention and of the comparative experiments

| Example | Polymer A/B [% by wt.] | Initial strength | Hardness of the seam | Open time [minutes] |
|---|---|---|---|---|
| 3 (comparison) | 100/0 | yes | hard | 1 |
| 4 (comparison) | 93.8/6.2 | yes | hard | 1 |
| 5 (according to the invention) | 90.2/9.8 | yes | intermediate | 3 |
| 6 (according to the invention) | 87.8/12.2 | yes | intermediate | 4 |
| 7 (according to the invention) | 81.9/18.1 | yes | intermediate | 7 |
| 8 (according to the invention) | 76.2/23.8 | yes | intermediate | 7 |
| 9 (according to the invention) | 70.6/29.4 | yes | intermediate | 7 |

TABLE-continued

Results of the experiments according to the invention and of the comparative experiments

| Example | Polymer A/B [% by wt.] | Initial strength | Hardness of the seam | Open time [minutes] |
|---|---|---|---|---|
| 10 (according to the invention) | 65.1/34.9 | yes | intermediate | 7 |
| 11 (according to the invention) | 54.5/45.5 | yes | intermediate | 6 |
| 12 (according to the invention) | 44.4/55.6 | yes | intermediate | 4 |
| 13 (according to the invention) | 34.8/65.2 | yes | soft | 3 |
| 14 (comparison) | 25.5/74.5 | no | not determinable | 0 |
| 15 (comparison) | 0/100 | no | not determinable | 0 |

The invention claimed is:

1. A method of adhesive bonding a foam substrate comprising 1) spraying an aqueous adhesive dispersion component and a coagulant component onto a first substrate to form an adhesive surface, wherein the aqueous adhesive dispersion component and the coagulant component are mixed in a spray jet and wherein the aqueous dispersion component coagulates in the spray jet, 2) applying a second substrate to the adhesive surface, and 3) forming an adhesive bond between the first substrate and the second substrate;
   wherein at least one of the first substrate or the second substrate is a foam substrate;
   wherein the aqueous adhesive dispersion component comprises a mixture of
      a) an aqueous polyurethane or polyurethane-urea dispersion containing
         I. a polymer A) formed from
            I (i). at least one difunctional aliphatic polyester polyol having a molecular weight of 400 to 5000 g/mol,
            I (ii). at least one mixture of hexamethylene diisocyanate (HDI) and 1-isocyanato-3,3,5-trimethyl-5-isocyanatomethylcyclohexane (IPDI), and
            I (iii). at least one mixture of two or more aminic chain extenders, wherein at least one aminic chain extender bears an ionic group, and the polymer A) after drying is semicrystalline or crystalline with a glass transition at a glass transition temperature Tg of between −65° C. and −40° C., and
      b) an aqueous polyurethane or polyurethane-urea dispersion which differs from dispersion a) and contains
         II. a polymer B) formed from
            II (i). at least one difunctional aromatic polyester polyol having a molecular weight of 400 to 5000 g/mol,
            II (ii). at least one difunctional polyol component having a molecular weight of 62 to 399,
            II (iii). at least one aliphatic diisocyanate and
            II (iv). at least one aminic chain extender having an ionic group,
      wherein the polymer B) after drying is amorphous with a glass transition at a glass transition temperature Tg of between −15° C. and +10° C.;
      and wherein the mixture of dispersion a) and dispersion b) contains 34.8% to 90.2% by weight of polymer A) and 9.8% to 65.2% by weight of polymer B), based on a sum total of polymers A) and B).

2. The method as claimed in claim 1, wherein the mixture of dispersion a) and dispersion b) contains 44.4% to 87.8% by weight of polymer A) and 12.2% to 55.6% by weight of polymer B).

3. The method as claimed in claim 1, wherein the mixture of dispersion a) and dispersion b) contains 54.5% to 81.9% by weight of polymer A) and 18.1% to 45.5% by weight of polymer B).

4. The method as claimed in claim 1, wherein component a) I(ii). is a mixture of HDI and IPDI with an HDI:IPDI molar ratio of between 9:1 and 1:9.

5. The method as claimed in claim 1, wherein component a) I(ii). is a mixture of HDI and IPDI with an HDI:IPDI molar ratio of between 3:1 and 1:3.

6. The method as claimed in claim 1, wherein component a) I(iii). is a mixture of diethanolamine and a sodium salt of N-(2-aminoethyl)-2-aminoethanesulfonic acid.

* * * * *